United States Patent
Lomet et al.

(10) Patent No.: US 7,418,462 B2
(45) Date of Patent: Aug. 26, 2008

(54) OPTIMIZED RECOVERY LOGGING

(75) Inventors: David B. Lomet, Redmond, WA (US);
Roger S. Barga, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 10/720,622

(22) Filed: Nov. 24, 2003

(65) Prior Publication Data

US 2005/0114731 A1    May 26, 2005

(51) Int. Cl.
G06F 17/30 (2006.01)
G06F 15/16 (2006.01)
G06F 11/00 (2006.01)

(52) U.S. Cl. .................. 707/202; 707/8; 709/231; 714/15

(58) Field of Classification Search ........ 707/1–10, 707/100–102, 104.1, 200–204; 705/50–53; 709/219, 227, 27; 713/150; 714/11, 13, 714/15–18; 719/313, 318
See application file for complete search history.

(56) References Cited

U.S. PATENT DOCUMENTS

| | | | | |
|---|---|---|---|---|
| 4,888,800 A | * | 12/1989 | Marshall et al. | 380/281 |
| 5,261,089 A | * | 11/1993 | Coleman et al. | 707/8 |
| 5,335,343 A | * | 8/1994 | Lampson et al. | 714/19 |
| 5,410,684 A | * | 4/1995 | Ainsworth et al. | 714/18 |
| 5,734,897 A | * | 3/1998 | Banks | 707/202 |
| 5,884,327 A | * | 3/1999 | Cotner et al. | 707/202 |
| 5,938,775 A | * | 8/1999 | Damani et al. | 714/15 |
| 6,006,331 A | * | 12/1999 | Chu et al. | 726/5 |
| 6,035,415 A | * | 3/2000 | Fleming | 714/11 |
| 6,154,847 A | * | 11/2000 | Schofield et al. | 714/4 |
| 6,178,457 B1 | * | 1/2001 | Pitchford et al. | 709/228 |
| 6,182,086 B1 | * | 1/2001 | Lomet et al. | 707/202 |
| 6,243,702 B1 | * | 6/2001 | Bamford et al. | 707/8 |
| 6,401,136 B1 | * | 6/2002 | Britton et al. | 719/314 |
| 6,684,223 B1 | * | 1/2004 | Ganesh et al. | 707/200 |
| 6,735,716 B1 | * | 5/2004 | Podanoffsky | 714/10 |
| 6,820,218 B1 | * | 11/2004 | Barga et al. | 714/17 |
| 7,103,884 B2 | * | 9/2006 | Fellin et al. | 717/169 |
| 7,120,752 B2 | * | 10/2006 | Wilson et al. | 711/135 |
| 7,152,180 B2 | * | 12/2006 | Shoaib et al. | 714/4 |
| 2001/0000812 A1 | * | 5/2001 | Waldo et al. | 709/225 |
| 2001/0011305 A1 | * | 8/2001 | Barker | 709/237 |
| 2002/0073071 A1 | * | 6/2002 | Pong et al. | 707/1 |
| 2002/0169996 A1 | * | 11/2002 | King et al. | 714/8 |
| 2003/0191984 A1 | * | 10/2003 | Flaherty et al. | 714/20 |

(Continued)

OTHER PUBLICATIONS

Mitterdorfer, S. et al., "A Corba Persistent State Service Based on a UML Model to a Relational Database Mapping", *Information Systems and Databases, Proceedings of the IASTED International Conference*, Sep. 25-27, 2002, 55-60.

(Continued)

*Primary Examiner*—Miranda Le
(74) *Attorney, Agent, or Firm*—Woodcock Washburn LLP

(57) ABSTRACT

A system, method and computer-readable medium for optimizing recovery logging is provided. A calling component stably logs a message from a called component only when sending a second message or sending a second message after a log force that writes the return message from the first message to the stable log. The called component stably logs its return message before the return message is sent.

19 Claims, 8 Drawing Sheets

U.S. PATENT DOCUMENTS

| | | | |
|---|---|---|---|
| 2003/0233594 A1* | 12/2003 | Earl | 714/4 |
| 2003/0236826 A1* | 12/2003 | Islam et al. | 709/203 |
| 2004/0078637 A1* | 4/2004 | Fellin et al. | 714/6 |
| 2005/0028171 A1* | 2/2005 | Kougiouris et al. | 719/318 |
| 2005/0033925 A1* | 2/2005 | Wilson et al. | 711/133 |

OTHER PUBLICATIONS

Barga, R. et al., "Persistent Applications via Automatic Recovery", *IDEAS Conference*, Jul. 2003, 10 pages.

Barga, R.S., "Phoenix Application Recovery Project", *Bulletin of the IEEE Computer Society Technical Committee on Data Engineering*, Dec. 2002, 1-6.

Barga, R. et al., "Phoenix Project: Fault-Tolerant Applications", *SIGMOD Record 31*, Jun. 2002, 94-100.

Barga, R. et al., "Recovery Guarantees for General Multi-Tier Applications", *ICDE Conference*, San Jose, Ca, Mar. 2002, 543-554.

Barga, R.S. et al., "Persistent Client-Server Database Sessions", *EDBT Conference*, Lake Constance, Germany, Mar. 2000, 462-477.

Barga, R. et al., "Phoenix: Making Applications Robust", *SIGMOD Conference*, Philadelphia, Pa., Jun. 1999, 562-564.

Lomet, D.B., "High Speed On-Line Backup when using Logical Log Operations", *SIGMOD Conference* Dallas, TX, May 2000, 7 pages.

Lomet, D. et al., "A Theory of Redo Recovery", *SIGMOD Conference*, San Diego, Ca., Jun. 2003, 10 pages.

Lomet, D. et al., "Efficient Transparent Application Recovery In Client-Server Information Systems", *SIGMOD Conference*, Seattle Wa., Jun. 1998, 1-23.

Lomet, D., "Application Recovery: Advances Toward an Elusive Goal", *HPTS Workshop*, Asilomer, Ca., Sep. 1997, 1-4.

Lomet, D., "Persistent Applications Using Generalized Redo Recovery", *ICDE Conference*, Orlando, Fla., Feb. 1998, 154-163.

Lomet, D.B., "MLR: A Recovery Method for Multi-level Systems", *SIGMOD Conference*, Jun. 1992, 185-194.

Lomet, D. et al., "Redo Recovery after System Crashes", *Proceedings of the 21st VLDB Conference*, Sep. 1995, 457-468.

Lomet, D. et al., "Logical Logging to Extend Recovery to New Domains", *SIGMOD*, 1999, 73-84.

Randell, B., "System Structure for Software Fault Tolerance", *IEEE Transactions. on Software Eng.*, Jun. 1975, SE-1, 2, 220-232.

Shegalov, G. et al., "EOS: Exactly-Once E-Service Middleware", *Proceedings of the 28th VLDB Conference*, Hong Kong, China, Aug. 2002, 4 pages.

Weikum, G., "A Theoretical Foundation of Multi-Level Concurrency Control", *PODS Conference*, 1986, 31-42.

\* cited by examiner

OPTIMIZED RECOVERY LOGGING

FIELD OF THE INVENTION

The invention relates to computing and in particular to a technique that optimizes the use of redo recovery enabling stateful applications to persist across crashes.

BACKGROUND OF THE INVENTION

After a soft crash, (a system failure in which stable storage is unaffected), a database is generally recovered to the last committed transaction and uncommitted or incomplete transactions are aborted. Although database state is recovered, the state of an application using the database, and its session, are typically lost.

U.S. Pat. No. 6,182,086 "Client-Server Computer System with Application Recovery of Server Applications and Client Applications" issued Jan. 20, 2001, describes a technique in which a stable log file is generated that is used to help recover a client-side application when a system crash occurs. U.S. patent application Ser. No. 09/946,050 "Recovery Guarantees for General Multi-Tier Applications", filed Sep. 1, 2001 and U.S. patent application Ser. No. 09/946,092 "Persistent Stateful Component-Based Applications Via Automatic Recovery", filed Sep. 1, 2001, describe other techniques for recovering an application after a system crash. For example, a stateless application may be broken into steps, each step executing within a transaction. Applications with state (stateful applications) can be recovered by intercepting interactions between components and stably logging them. In prior techniques implementing this approach, a client interacting with a number of servers: server 1, server 2 ... server n, logs a message returned by server 1 (in a memory buffer, for instance) and forces the log (writes the memory buffer to stable storage) before sending a message to server 2 in order to capture all non-determinism encountered up to that point.

The overhead involved in all these techniques for recovering applications is relatively high. It would be helpful if there were an optimized recovery technique that would reduce the number of forced log writes required.

SUMMARY OF THE INVENTION

Stateful program components are persisted across system crashes via a technique of redo logging and application replay. Messages (inter-component interactions) are logged. Between interactions between components, the components execute deterministically. Thus, by using the logged messages and re-executing the component between message interactions, component state can be recreated.

The overhead required to persist stateful components is determined by the number of messages that have to be logged to the memory buffer and the number and timing of forced writes to the stable log. To achieve stateful component persistence, a committed interaction contract between the persistent components is established. When a calling persistent component issues calls to a number of different called persistent components, each called component must guarantee the persistence of its last return message to the calling component until the calling component releases the called component from this obligation. Thus, any non-determinism that may exist is captured stably in the logging at the called component. Because the calling component does not release the called component from its obligation to guarantee the persistence of the last return message until the calling component calls the called component a second time, the calling component does not have to force the log before each call to a called component. Should the calling component crash, the calling client can replay the application, and obtain the reply message from the called component's stable log.

A system, method and computer-executable medium containing computer-executable instructions to provide the above-described optimized recovery technique is described in more detail below.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The overhead required to persist stateful components is determined by the number of messages that have to be logged and the number and timing of forced writes to the log. To achieve stateful component persistence a committed interaction contract between the persistent components is established. Suppose, for example, that a calling component (a client, for instance) makes a number of calls to different called (server) components. When the client issues calls to a number of different servers, each server component must guarantee the persistence of its last return message to the client component until the client component releases the server component from this obligation. Thus, any non-determinism that may exist is captured stably in the logging at the server component. Because the client component does not release the server component from its obligation to guarantee the persistence of the last return message until the client component calls that server component a second time, the client component does not have to force the log before each call to a server component. Instead the client component only forces a log before the second call to the previously-called server component.

A called component table is maintained that keeps a history of calls made by the calling component to called components, and a log sequence number associated with each component (CLSN). Calls that have been written from the called component table to the stable log can be distinguished from calls that have not been written to the stable log by comparing the log sequence number in the table (the CLSN) with a highest log sequence number written to the stable log. Forcing a log resets the status of a "previously-called" component to "uncalled" or "not called since the last log force".

Exemplary Computing Environment

Figure 1:
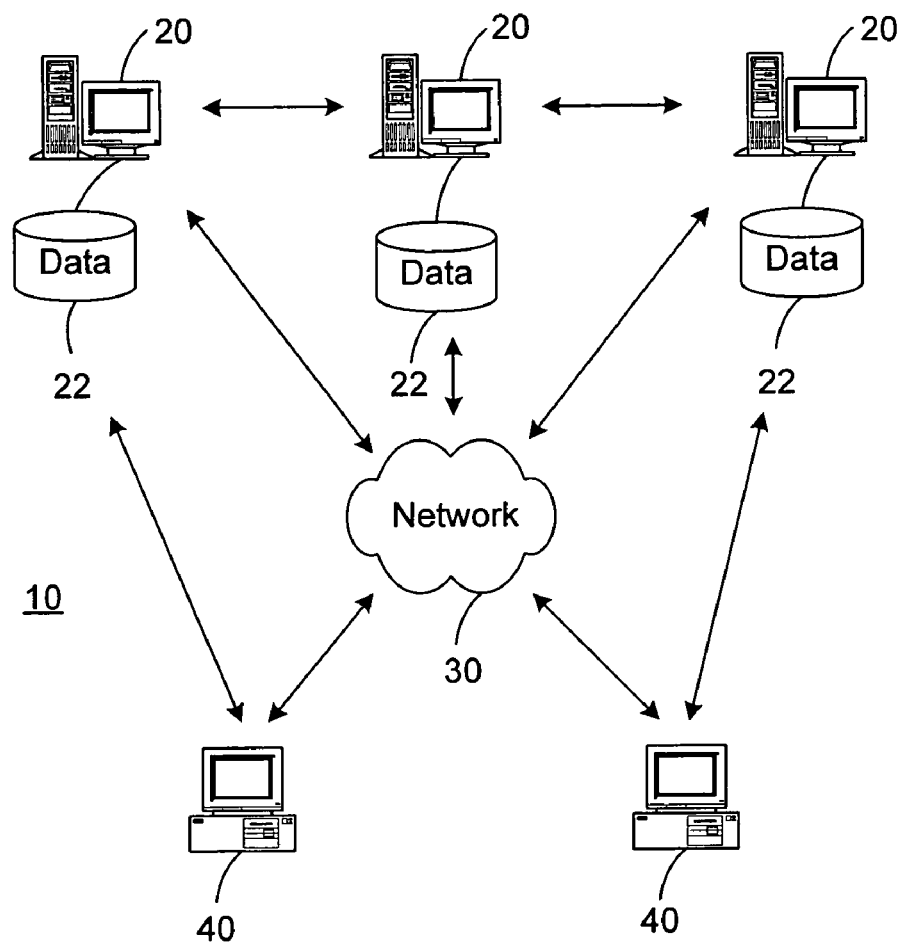
FIG. 1 illustrates a high level example of a distributed computing environment in which the invention may be implemented.

FIG. 1 illustrates a high level example of a distributed computing environment 10 in which the invention may be implemented. A plurality of servers 20, each having memory 22, are interconnected, either directly or through an optional switching network 30. A plurality of clients 40 are connected to the servers 20, either directly or through the network 30. The client 40 runs an operating system that supports multiple applications. The operating system is preferably a multitasking operating system that allows simultaneous execution of multiple applications. The operating system may employ a graphical user interface windowing environment that presents the applications or documents in specially delineated areas of the display screen called "windows." One such operating system is a Windows® brand operating system sold by Microsoft Corporation, such as Windows® 95 or Windows® NT or other derivative versions of Windows®. It is noted, however, that other operating systems that provide windowing environments may be employed, such as the Macintosh operating system from Apple Computer, Inc. and the OS/2 operating system from IBM.

Figure 2:
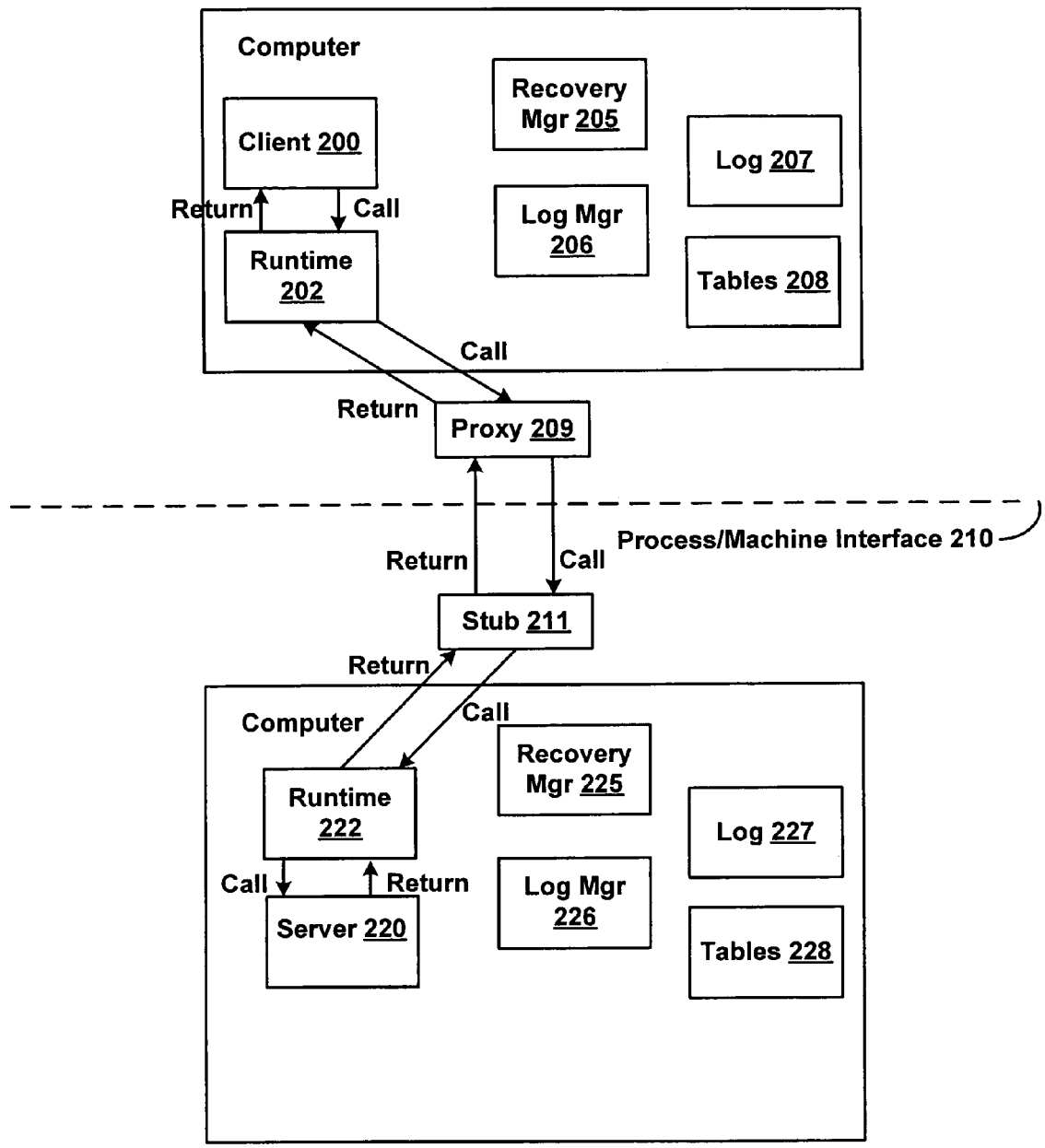
FIG. 2 illustrates exemplary relationships between pieces of a component-based application running in accordance with one embodiment of the invention.

FIG. 2 illustrates the position and relationship of various functional elements such as code modules of a component-based application running in accordance with the present invention. The elements 200 and 220 can be any component, acting as a client, server, or both. The invention as contemplated is not limited to the recovery of components acting in the role of a server responding to requests from other client components. For simplicity, it is assumed that the client 200 and server 220 are disposed in different processes or machines, so there are two different component runtimes (modules) (a client-side component runtime 202 and server-side component runtime 222), along with a proxy 209 and a stub 211. Calls or messages may be logged as directed by log manager 206, 226 in logs 207, 227, respectively. Tables 208 and 228 may include a called component table, a last call table, and others.

An error handler (not shown) may be registered with each component runtime 202, 222. Furthermore, two recovery managers 205, 225 are provided because of the machine boundary 210 between the server 220 and the client 200. When the client 200 issues a call to server 220, the call is intercepted by the component runtime 202 which captures the message in a log 207. The call is passed to the proxy 209, which sends the message, (e.g,. a method call message), across the boundary 210 to the stub 211. The stub calls the server side component runtime 222, which delivers the call. The process is reversed for a return message.

Figure 3:
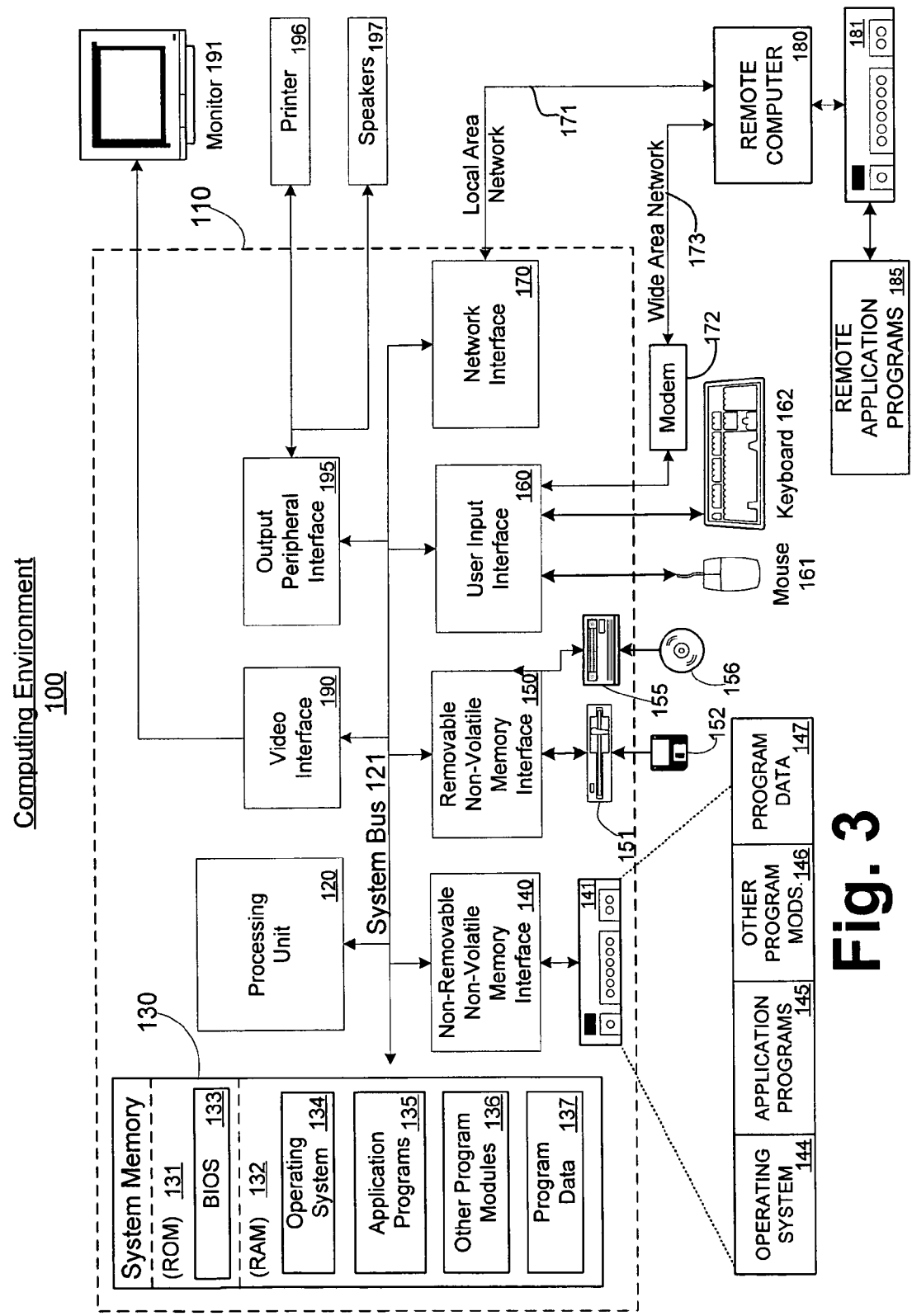
FIG. 3 is a block diagram showing an exemplary computing environment in which aspects of the invention may be implemented.

FIG. 3 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 3 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3 provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Optimizing Committed Interaction Contracts

Figure 4:
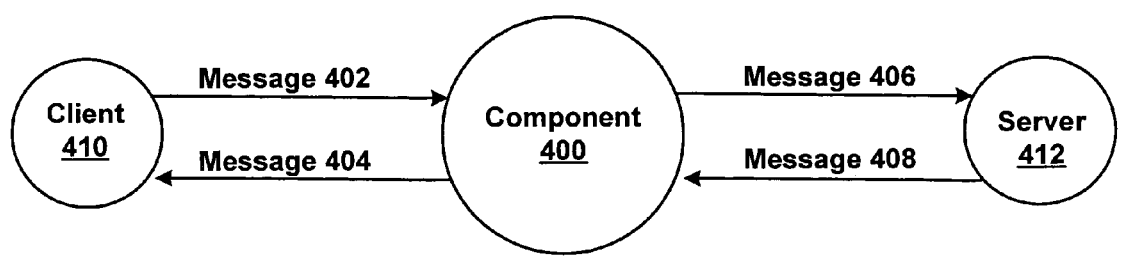
FIG. 4 illustrates messages received by and sent from a component in accordance with one aspect of the application.

A component is typically an object instance (e.g., C++, Java C#, etc.) operating within a runtime environment, (e.g., CORBA, Enterprise Java Beans, MICROSOFT .NET®, etc.). Component states are stored in object fields and operations on the object instance are performed by calling methods. Components communicate via local or remote method calls. As illustrated in FIG. 4, a component 400 can detect four kinds of messages: an incoming method call 402 from a client component 410; a reply message 404 to the client component 410; an outgoing method call 406 to a server component 412 and a response 408 from the server component 412.

Persistent components are components that survive a system crash. In order to ensure that a component is persistent, the following guarantees must be made:

1. When sending a message (such as message 404 and 406 in FIG. 4), the component ensures that the message and its state as of the send are persistent (such as by writing the state and message to a stable log or by replaying method calls).

2. When making a method call, a persistent component attaches a globally unique ID to the deterministically-derived outgoing method call message.

3. When receiving a method call from another persistent component, a persistent component checks the globally unique ID, to determine if the message has been received already. If it has not, processing continues normally. If it has, the component returns the reply of the previous method call with the same ID.

4. A persistent component repeats an outgoing method call to a server until the component receives a response back.

5. When recovering from a failure, if a persistent component was responding to an incoming method call before the failure, it does not send the reply (message 404) until a reply is requested by the client.

The making of these guarantees between persistent components is sometimes referred to as a committed interaction contract. While it is possible for components to contain explicit application code to realize a committed interaction contract, it is much more effective to implement such a contract by an interception mechanism that captures method calls and returns made between software components. To recover a failed component, all logged incoming method calls are replayed from component creation or checkpoint until failure. Because all messages are persisted (by writing to a stable log, for instance), component state can be recovered back to the time of the last send message and execution can resume.

To replay an incoming method call, the logged method is called with the logged parameters. An outgoing call is suppressed if a reply to the call is found in the log. In that case, the reply is read from the log and returned. Otherwise either the last message is a return and recovery is complete without resending it, or the last message is an outgoing call, recovery is complete and the message is resent. Normal processing may then resume.

Previously known techniques enable components to be persistent by logging and forcing the log for each message sent and received. To recover a failed persistent component, all the method calls are replayed. A prior optimization involved forcing the log only when a message is sent, rather than both when a message is sent and when a message is received.

If, however, instead of examining each call in isolation, the effect of multiple calls is taken into account, the number of forced log writes can be diminished, realizing improved performance.

Figure 5:
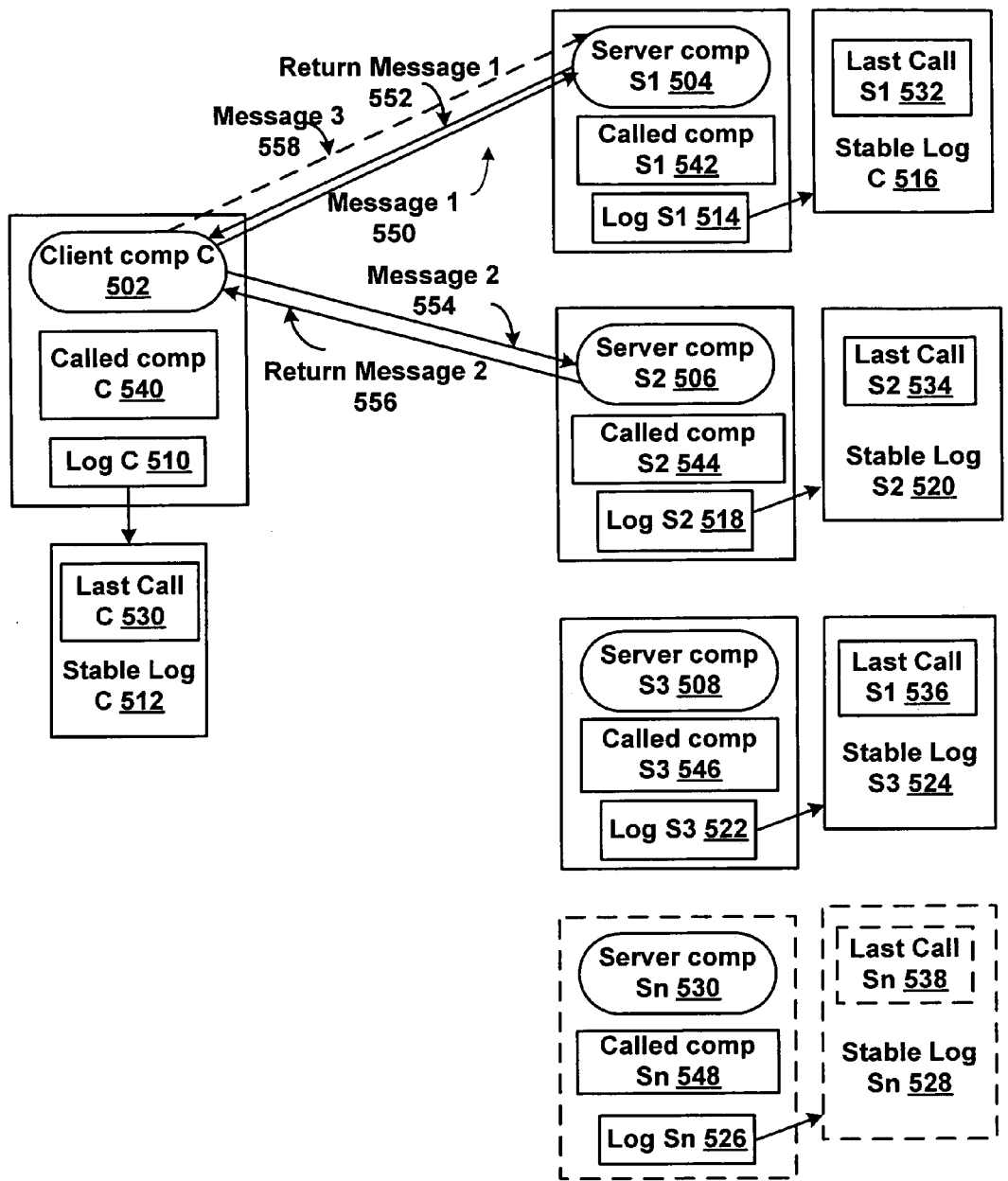
FIG. 5 illustrates a persistent component that calls multiple components in accordance with one embodiment of the invention.

Consider, for example, a persistent component that calls multiple components. The calling component may be a client, for instance and the called components may be server components. It will be understood, however, that as used herein, the terms "client" and "server" refer to roles assumed within a particular interaction, rather than machine characteristics. Thus a "client" (calling) component in one interaction may well be a "server" (called) component in another interaction. In FIG. 5, client persistent component C 502 communicates with multiple persistent server components, server component S1 504, server component S2 506, server component S3 508, . . . server component Sn 530. Each persistent component is associated with a (volatile) memory buffer log and a stable log (e.g., client component C 502 is associated with a (memory buffer) log C 510 and stable log C 512, server component S1 504 is associated with a (memory buffer) log S1 514 and stable log S1 516, server component S2 506 is associated with a (memory buffer) log S2 518 and stable log S2 520, server component S3 508 is associated with a (memory buffer) log S3 522 and stable log S3 524 and server component n 530 is associated with a (memory buffer) log n 526 and stable log n 528.) Memory buffer logs 510, 514, 518, 522 and 526 and stable logs 512, 516, 520, 524 . . . 528 may include last call tables 530, 532, 534, 536 . . . 538 and called component tables 540, 542, 544, 546 . . . 548 respectively. Alternatively, last call tables 530, 532, 534, 536 . . . 538 may exist independently of stable logs 512, 516, 520, 524 . . . 528. Similarly, called component tables 540, 542, 544, 546 . . . 548 may exist independently of stable logs 512, 516, 520, 524 . . . 528. Memory buffer logs 510, 514, 518, 522 and 526 and stable logs 512, 516, 520, 524 . . . 528 may include sufficient information to re-create other tables not shown in FIG. 5. Stable logs 512, 516, 520, 524 . . . 528, last call tables 530, 532, 534, 536 . . . 538, called component tables 540, 542, 544, 546 . . . 548 and other tables in some embodiments of the invention reside on stable storage media such as disk, tape, CDROM or the like. Alternatively, a number of persistent components may share a single stable log and tables.

A called component table, such as, for example, called component table C 540, may include the components called by a calling component (e.g., calling component C 502). The called component table may also include, in some embodiments, messages sent to a called component and/or received from the called components or a location of or pointer to those messages. Hence called component table C 540 may include one or more components for which messages have not yet been written to stable log C 512. Called component table C 540 may also include a list of components for which messages have been written to stable log C 512. Components for which messages have been written to stable log C 512 may be distinguished from those for which messages have not been written to stable log C 512 by the presence or absence of an identifier or marker, or by a comparison of a log sequence number and component log sequence number (CLSN). Alternatively, components for which messages have been written to stable log C 512 may be removed or deleted from called component table C 540.

In the absence of context information, each of the calls between persistent components commit component state and therefore must force the log. However certain provisions of the committed interaction contract between the persistent components can be exploited to realize performance advantages under certain circumstances, as described below.

Figure 6:
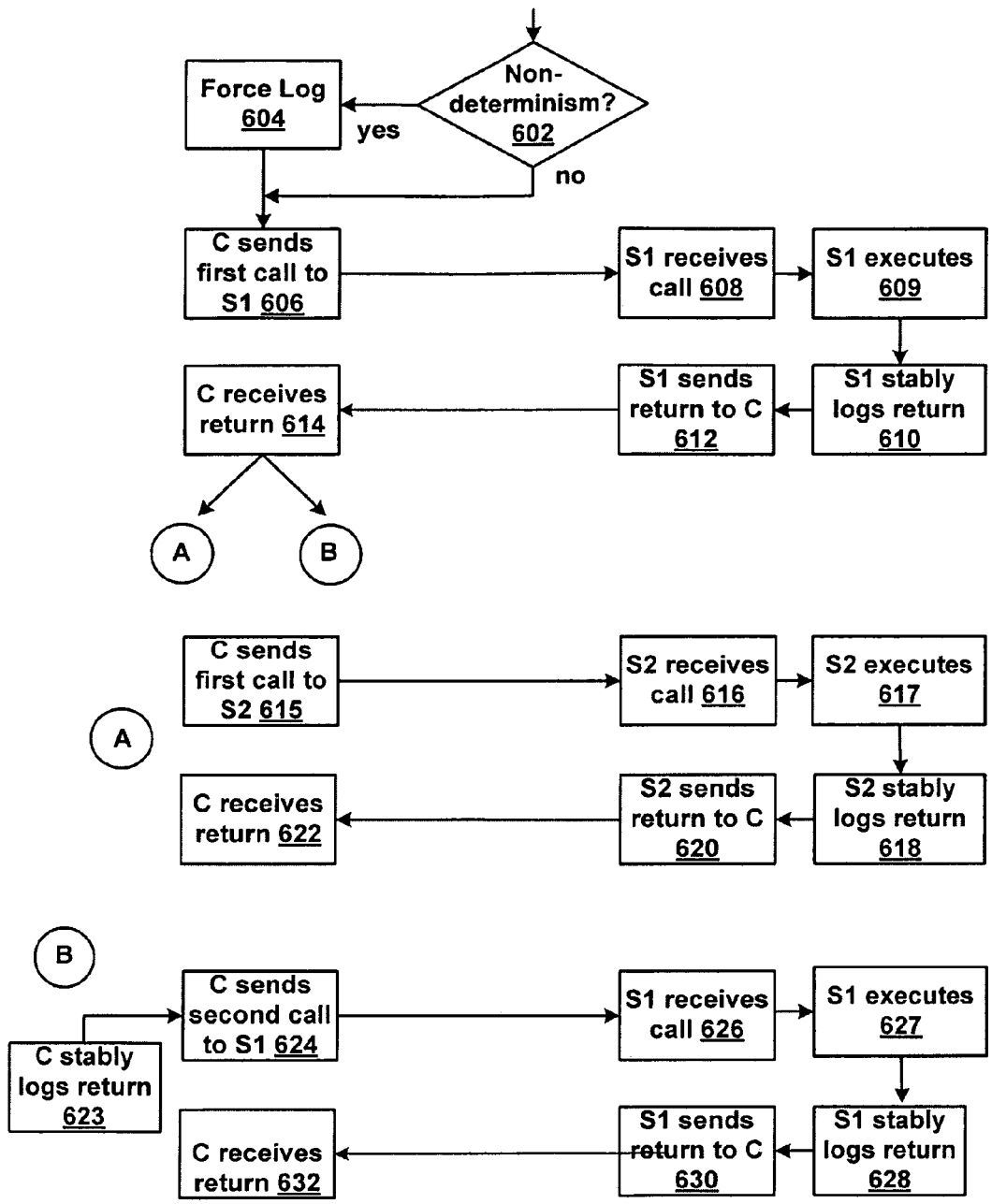
FIG. 6 illustrates a flow diagram of a method of optimized recovery logging in accordance with one embodiment of the invention.

Referring now concurrently to FIG. 5 and to the flow diagram of FIG. 6, in accordance with one embodiment of the invention, an exemplary method 600 of realizing an optimized committed interaction contract is described. If non-determinism is detected (602) at a calling component, the calling component forces a log (604). The forced log captures all non-determinism encountered up to that point by the calling component.

For example, referring to FIG. 5, client component C 502 may write the last return message received from a component to memory buffer log C 510 and/or force a log to stable log C 512.

The calling component may send a call to a (remote) persistent component (606) that has not been previously called, and hence is not in the called component table. For example, client component C 502 may send a first call message (Message 1 550) to a remote persistent component S1 504. In some embodiments of the invention, the calling component determines that the persistent component has not been previously called, by consulting a called component table (e.g., called component table C 540) or other suitable data structure that includes a list of previously called components.

In some embodiments of the invention, the call message sent to the called component is assigned a globally unique identifier. A record of the call message or a pointer thereto, may be logged in a memory buffer and/or logged stably. For example, Message 1 550 may be logged in Log C 510 and/or saved stably in Stable Log C 512. In some embodiments of the invention, the called component identifier and the message or a pointer to the message is stored in the called component table, indexed by remote component identifier in the memory buffer or stable log.

The called component may subsequently receive the call (608). For example, server component S1 504 may receive the call message (Message 1 550) from client component C 502. The called component may then execute the called procedure body (609).

In one embodiment of the invention, the called component may stably log the return message (610) or otherwise make the message re-creatable. For example, server component S1 may stably log Return Message 1 552 to stable log S1 516. The called component may send a return message (612). For example, server component S1 504 may send Return Message 1 552 to client component C 502. In some embodiments of the invention, the return message (e.g., Return Message 1 552) is identified by the globally unique identifier assigned to the call message (e.g., Message 1 550).

It will be understood that while in exemplary method 600 the return message is sent after the return message is stably logged, these steps may be reversed in order or may occur substantially concurrently, in some cases. For example, in the absence of non-determinism, the return message may be sent before being logged or may be sent concurrently with logging. In some embodiments of the invention, the return message (e.g., Return Message 1 552) is stored in a last call table (e.g., last call table S1 532). The return message may be saved in an intermediate step in the memory buffer log (e.g., log S1 514) in some embodiments of the invention.

The calling component may receive the return message (614). For example, client component C 502 may receive Return Message 1 552. The calling component may log the return message in the calling component's memory buffer but does not force the log at this point. For example, client component C 502 may log the Return Message 1 552 in log C 510, but does write to stable log C 512 at this point.

The calling component may then prepare to send another call message. For example, client component C 502 may then prepare to send Message 2 554. Suppose, as shown in A, the next message the calling component sends is a message to a remote component that has not been previously called (that is, has not been called since the last log force) by the calling component (615). For example, suppose client component C 502 sends Message 2 554 to server component S2 506. Message 2 554 is another "first message" sent to a remote persistent component because no messages have been sent to server component S2 506 since the last log force. In some embodiments of the invention, the call message (e.g., Message 2 554) sent to the called component (e.g., server component S2 506) is assigned a globally unique identifier. A record of the call message (e.g., Message 2 554) or a pointer thereto, may be logged in the memory log buffer (e.g., Log C 510) and/or logged stably (e.g., a forced write to Stable Log C 512 performed). In some embodiments of the invention, a called component identifier and the message or a pointer to the message is stored in a called component table, indexed by called component identifier.

The called component may receive the call message (616). For example, server component S2 506 may receive Message 2 554 from client component C 502. The called component may execute the called procedure (617), log the return message in the called component's stable log and/or buffer log (618) and send a return message (620). For example, server component S2 506 may execute the called procedure (617), stably log Return Message 2 556 to its stable log S2 520 (618) and may send Return Message 2 556 to client component C 502 (620). In some embodiments of the invention, the return message (e.g., Return Message 2 556) is identified by the globally unique identifier assigned to the call message (Message 2 554). In some embodiments of the invention the return message (e.g., Return Message 2 556) is stored in a last call table (e.g., last call table S2 534).

The calling component may receive the return message (622). For example, client component C 502 may receive Return Message 2 556. The calling component may log the return message in the calling component's memory buffer but does not force the log at this point. For example, client component C 502 may log Return Message 2 556 in log C 510, but does write to stable log C 512 at this point.

Suppose, however, that instead of sending a first message to a persistent component that has not been called since the last log force, the called component sends a message to a component that has been called since the last log force. Such a circumstance is illustrated in process B.

Before a second message is sent to a previously called component (624), the calling component stably logs (623) the return message previously sent by the called component.

For example, client component C 502 may send a second call message (Message 3 558) to remote persistent component S1 504. Before Message 3 558 is sent to server component S1 504, Return Message 1 552 is written to stable log C 512 (623). In some embodiments of the invention, the calling component determines that the persistent component has been called since the last log force, by consulting a called component table or other suitable data structure that includes a list of components called since the last log force.

As described previously, in some embodiments of the invention, the call message sent to the called component is assigned a globally unique identifier. A record of the call message or a pointer thereto, may be logged in a memory buffer and/or logged stably. For example, Message 3 558 may be logged in Log C 510 and/or saved stably in Stable Log C 512. In some embodiments of the invention, the called component identifier and the message or a pointer to the message is stored in the called component table, indexed by called component identifier in the memory buffer or stable log.

The called component may subsequently receive the call (626). For example, server component S1 504 may receive the call message (Message 3 558) from client component C 502. The called component may execute the called procedure (627).

In one embodiment of the invention, the called component may stably log the return message (628). For example, server component S1 may stably log Return Message 3 to stable log S1 516. The called component may send a return message (630). For example, server component S1 504 may send Return Message 3 (not shown) to client component C 502. In some embodiments of the invention, the return message (e.g., Return Message 3) is identified by the globally unique identifier assigned to the call message (e.g., Message 3 558).

It will be understood that while in exemplary method 600 the return message is sent after the return message is stably logged, these steps may be reversed in order or may occur substantially concurrently in the absence of non-determinism. In some embodiments of the invention, the return message (e.g., Return Message 3 560) is stored in a last call table (e.g., last call table S1 532). The return message may be saved in an intermediate step in the memory buffer log (e.g., log S1 514) in some embodiments of the invention. In some embodiments of the invention, only the last return message is saved. Alternatively, any specified number of return messages may be saved in the last call table, thus avoiding the need to force the log until that number of return messages has been saved. For example, suppose the last call table can hold ten return messages. If ten return messages can be saved in the last call table, the calling component does not have to force the log until the tenth message is received, because if required, the ten return messages can be retrieved from the last call table.

The calling component may receive the return message (632). For example, client component C 502 may receive Return Message 3. The calling component may log the return message in the calling component's memory buffer but does not force the log at this point. Processing continues as described in A or B until the process ends. It will be understood that any number of components may be called before the calling component sends a second message to a previously called component and forces a log.

The savings in log writes realized thus is one log write for each component called since the last log force to which a calling component sends a message until a second call to a previously-called component is made. It will be understood that any number of components may be called by the calling component.

Figure 7:
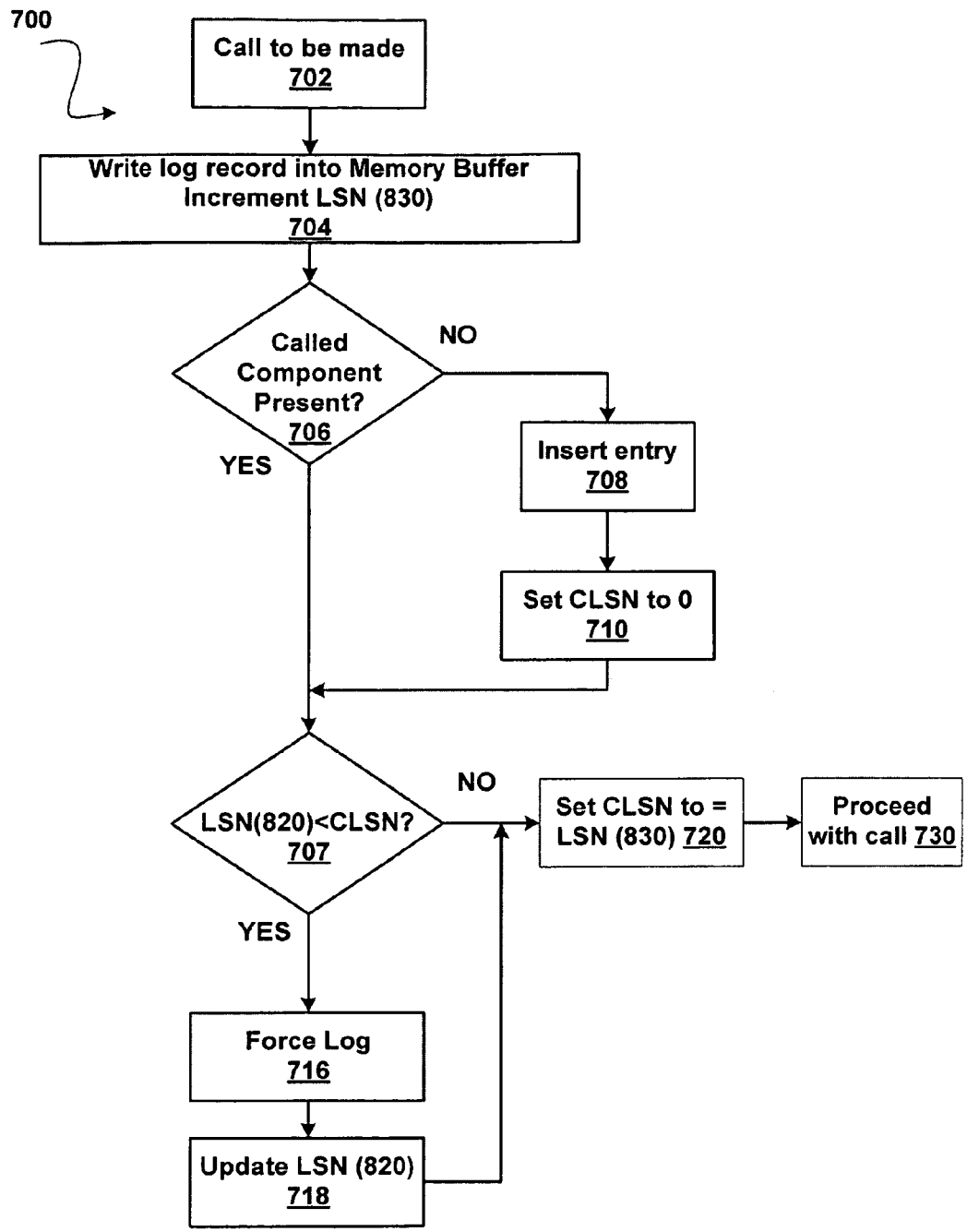
FIG. 7 illustrates a more detailed flow diagram of portions of the method of FIG. 6 in accordance with one embodiment of the invention.

FIG. 7 is a more detailed description of an exemplary method 700 of determining when a forced log is required. An exemplary called component table at different points in time (e.g., called component table C 540 of FIG. 5) is illustrated in FIG. 8*a*-8*d*.

A log sequence number (LSN) is a unique number assigned to a record placed on the log. The LSN may denote a location on the log and is incremented for each new record to be placed on the log. Referring now to FIG. 7, suppose that a call to a called component is to be made (702). For example, referring again to FIG. 5, suppose client component C 502 wants to send Message 1 550 to server component S1 504.

Figure 8A:
FIGS. 8a-8d illustrate an exemplary called component table which includes a corresponding highest log sequence number as it changes over time in accordance with one embodiment of the invention.

FIG. 8*a* represents called component table C 540 as it may exist before Message 1 550 is sent to server component S1 504. Exemplary entry 802 then may represent the last forced log write to stable log C 512. In some embodiments of the invention, entry 802 includes a called component (Sx), and a component log sequence number (CLSN) (also 100). CLSN, in some embodiments, is set to a lowest possible value (e.g., 0) when an entry is made to the called component table for a previously uncalled component, as described more fully below. CLSN may be compared with the highest LSN written to the stable log to determine if the return message associated with the entry has been written to the stable log. The highest LSN written to the stable log and the highest LSN written to the memory buffer are tracked, as illustrated by Highest LSN Table 850 table entries LSN 820 (highest LSN written to the stable log) and LSN 830 (highest LSN written to the memory buffer). In this case, both the highest LSN written to the stable log and the highest LSN written to the memory buffer are 100.

Figure 8B:

When Message 1 550 is to be sent to the called component S1 504 (702), the called component is entered into the called component table (804). The CLSN is set to zero, indicating that the component has not been called previously. When the return message is received back from called component S1, the return message is written to the memory buffer and the highest LSN number written to the memory buffer (LSN 830) is incremented (704). Because the last used LSN was 100 (for entry 802), the LSN for Message 1 550 may be 101, as shown in FIG. 8*b*, reference numeral 830. Then the CLSN is set to 101 (the same value as 830) in 804.

In some embodiments of the invention, the called component table is accessed (706) to determine if the called component has been called before. For example, referring to FIG. 8*a*, called component table C 540 may be accessed to determine if server component S1 504 is already in the called component table. As there is no entry in called component table C 540 for server component S1 504, an entry (entry 804) is made into called component table C 540 (708), as illustrated in FIG. 8*b* and CLSN is set to the lowest possible value (e.g., 0) (710).

Figure 8C:
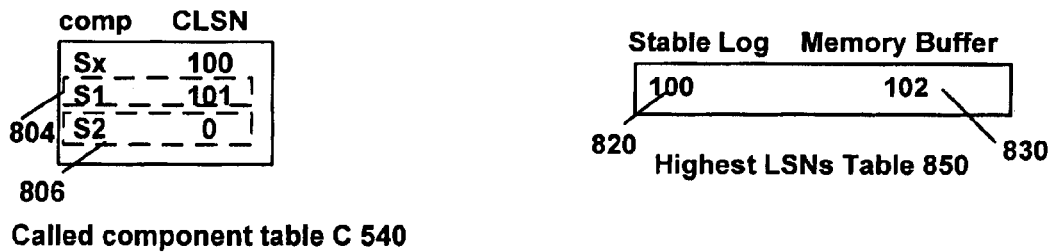

The highest LSN written to the stable log (LSN 820) is compared with the component LSN (CLSN) (707). For example LSN 820 of FIG. 8*b*(100) is compared with CLSN of entry 804 (0). As 100 is not less than 0, processing continues at step 720. CLSN is set to the highest LSN written to the memory buffer (LSN 830) 101, as shown in FIG. 8*c*, entry 804 when the return message from S1 is logged.

Processing may then continue as described above with respect to FIG. 6 (730). The message (e.g., Message 1 550 may be sent, the called procedure executed and a message returned. As no forced log has occurred, the highest LSN written to the stable log (LSN 820) is unchanged.

Suppose now that a message (e.g., Message 2 554) to server component S2 506 is to be sent from client component C 502 (702). The called component table C 540 (FIG. 8*b*) is accessed to determine if a call has been made to server component S2 506 (706) before. As no entry is found for server component S2 506, an entry 806 is made to called component table C 540 (708) and CLSN of entry 806 is set to 0 (710), as shown in FIG. 8*c*. The highest LSN written to the stable log (LSN 820) is compared with the component LSN (CLSN) (707). For example LSN 820 of FIG. 8*b*(100) is compared with CLSN of entry 806 (0). As 100 is not less than 0, processing continues at step 720. CLSN is set to the highest LSN written to the memory buffer (LSN 830) 102 (entry 806 of FIG. 8*d*).

Figure 8D:

Processing continues (730). Message 2 554 may be sent, the called procedure executed and a message returned. The return message is written to the memory buffer and the highest LSN number written to the memory buffer (LSN 830) is incremented (704) to 102 (FIG. 8*c*). This LSN (830) is then entered into the called component table as the CLSN entry for component S2 (FIG. 8d). As no forced log has occurred, the highest LSN written to the stable log (820) is unchanged.

Suppose now that a message (e.g., Message 3 558) to server component S1 504 is to be sent from client component C 502 (702). The called component table C 540 (FIG. 8c) is accessed to determine if a call has been made to server component S1 504 (706) before. An entry is found for server component S1 504 (that is, entry 804). To determine if entry 804 has already been written to the stable log, the LSN for entry 804 (CLSN of entry 804, 101) is compared to the highest LSN written to the stable log (LSN 820). Because the LSN for entry 804 (101) is greater than the highest LSN of the stable log (100), entry 804 has not been written to the stable log. The log is forced (716) and the highest LSN of the stable log (LSN 820) is set to the highest LSN of the memory buffer (LSN 830). Processing continues as described above (720). This is illustrated in FIG. 8d, where upon receiving the return message, the message is logged at LSN 103, and this LSN becomes the new value for 830 and for the CLSN of S1 (804).

It will be apparent that method 700 can be modified in numerous ways not departing from the spirit of the invention as contemplated. For example, instead of using LSN and CLSN to determine if an entry has been forced to the log, an indicator may be set, signifying that the entry has been written to the stable log.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the embodiments of the various figures, it is to be understood that other similar embodiments may be used or modifications and additions may be made to the described embodiments for performing the same function of the present invention without deviating therefrom. Similarly it will be understood that although the framework is described within the context of an automated way of intercepting messages, the invention is not so limited and may be used wherever persisting application programs is useful. Therefore, the present invention should not be limited to any single embodiment, but rather should be construed in breadth and scope in accordance with the appended claims.

What is claimed is:

1. A system for optimizing recovery logging, the system comprising:

a log storage device on a calling component machine;

a calling component module on the calling component machine, wherein the storage device stores a stable log associated with the calling component, the calling component module adapted to sending a first message to a called component of a plurality of called components receiving calls from the calling component module, wherein a contract between the calling component module and the called component requires the called component to guarantee persistence of its last return message to the calling component module until released by receiving a second message from the calling component module, wherein the calling component sends the first message without logging the first message to the log storage device, and wherein the calling component module is adapted to sending a second message to the called component, and logging a first return message to the log storage device when the second message to the called component is sent, wherein logging of the first return message on the log storage device is an only forced logging event on the calling component module enabling optimized recovery of incomplete requests in event of a system crash based on logged messages on the calling component module and the called component; and a called component table on the calling component machine for storing information associated with the first return message, wherein the called component determines whether the first return message received from the called component has been stably logged, the determination comprises:

(a) in response to determining that an entry for the called component is not in a table of information associated with called components, adding an entry for the first message to the table, the entry comprising an identifier for the called component, and a log sequence number set to a lowest possible value;

(b) in response to determining that the entry for the called component is in the table of information associated with called components, comparing a highest stably logged log sequence number with the log sequence number in the table entry, wherein:

(i) in response to determining that the highest stably logged log sequence number is greater than the log sequence number in the entry, proceeding to call the called component without forcing the log;

(ii) in response to determining that the highest stably logged log sequence number is less than the log sequence number in the table entry, forcing the log so that the highest stably logged record has a higher log sequence number than the table entry; and (iii) updating the highest stably logged log sequence number to a highest log sequence number written to the stable log.

2. The system of claim 1, further comprising a highest log sequence table for storing a highest log sequence number written to a memory buffer and a highest log sequence number written to the storage device.

3. The system of claim 1, wherein the called component table comprises a log sequence number associated with the called component for determining a status of the return message.

4. The system of claim 3, wherein the status of the first return message is determined by comparing the highest log sequence number written to memory and the highest log sequence number written to the storage device and a log sequence number associated with the called component.

5. The system of claim 1, wherein a status of the called component's return message is reset when the message is logged to the storage device.

6. The system of claim 1, further comprising a storage device for storing a stable log associated with the called component.

7. The system of claim 1, wherein the calling component module sends at least one message to a plurality of called components.

8. The system of claim 1, wherein the calling component persists over a system failure.

9. The system of claim 1, wherein the called component persists over a system failure.

10. The system of claim 1, wherein the stable log associated with the calling component persists over a system failure.

11. The system of claim 1, wherein a stable log associated with the called component persists over a system failure.

12. The system of claim 1, wherein only the last message sent by the called component is guaranteed to be stably stored with the called component.

13. The system of claim 6, wherein the stable log comprises a component identifier and a message.

14. A method of recovery logging comprising:
determining whether a first return message received from a called component has been stably logged on a called component machine, wherein a contract between a calling component, having a log storage device, and the called component requires the called component to guarantee persistence of its last return message to the calling component until released by receiving a second message from the calling component, wherein logging of the first return message on the log storage device is an only forced logging event on the calling component, wherein the first return message is received in response to a first message sent from the calling component to the called component, wherein the calling component resides on a calling component machine different than the called component machine;
in response to determining that the first return message has not been stably logged, logging at least the first message to a stable log on the called component before a second message is sent to the calling component, wherein the logging enables recovery of incomplete requests in event of a system crash;
wherein the step of determining whether the first return message received from the called component has been stably logged comprises:
(a) in response to determining that an entry for the called component is not in a table of information associated with called components, adding an entry for the first message to the table, the entry comprising an identifier for the called component, and a log sequence number set to a lowest possible value;
(b) in response to determining that the entry for the called component is in the table of information associated with called components, comparing a highest stably logged log sequence number with the log sequence number in the table entry, wherein:
(i) in response to determining that the highest stably logged log sequence number is greater than the log sequence number in the entry, proceeding to call the called component without forcing the log;
(ii) in response to determining that the highest stably logged log sequence number is less than the log sequence number in the table entry, forcing the log so that the highest stably logged record has a higher log sequence number than the table entry; and
(iii) updating the highest stably logged log sequence number to a highest log sequence number written to the stable log.

15. The method of claim 14, further comprising sending at least one message to a plurality of called components before forcing a log.

16. The method of claim 14, wherein the called component persists over a system failure.

17. The method of claim 14, wherein the calling component persists over a system failure.

18. The method of claim 14, wherein messages sent to the called component are uniquely identified.

19. A computer-readable storage medium including computer-executable instructions for:
sending a first call message to a called component from a calling component, wherein a contract between the calling component and the called component requires the called component to guarantee persistence of its last return message to the calling component until released by receiving a second message from the calling component wherein logging of the first return message on the log storage device is an only forced logging event on the calling component;
sending a second call message to the called component from the calling component;
logging a first return message to the first call message in a stable log on the called component machine;
logging the first return message to the first call message in a stable log on a log storage device of the calling component machine when the second call message to the called component is sent; and
determining whether the first return message received from the called component has been stably logged on a called component machine;
wherein the step of determining comprises:
(a) in response to determining that an entry for the called component is not in a table of information associated with called components, adding an entry for the first call message to the table, the entry comprising an identifier for the called component, and a log sequence number set to a lowest possible value;
(b) in response to determining that the entry for the called component is in the table of information associated with called components, comparing a highest stably logged log sequence number with the log sequence number in the table entry, wherein:
(i) in response to determining that the highest stably logged log sequence number is greater than the log sequence number in the entry, proceeding to call the called component without forcing the log;
(ii) in response to determining that the highest stably logged log sequence number is less than the log sequence number in the table entry, forcing the log so that the highest stably logged record has a higher log sequence number than the table entry; and
(iii) updating the highest stably logged log sequence number to a highest log sequence number written to the stable log.

* * * * *